(12) United States Patent
Åhman et al.

(10) Patent No.: US 6,508,994 B1
(45) Date of Patent: Jan. 21, 2003

(54) METHOD AND APPARATUS FOR CLEANING FLUE GASES

(75) Inventors: Stefan Åhman, Växjö (SE); Nils Bringfors, Växjö (SE)

(73) Assignee: ABB Fläkt AB, Stockholm (SE)

(*) Notice: Subject to any disclaimer, the term of this patent is extended or adjusted under 35 U.S.C. 154(b) by 0 days.

(21) Appl. No.: 09/712,189

(22) Filed: Nov. 15, 2000

Related U.S. Application Data

(63) Continuation of application No. PCT/SE99/00806, filed on May 12, 1999.

(30) Foreign Application Priority Data

May 18, 1998 (SE) .............................................. 9801734

(51) Int. Cl.⁷ .............................................. B01D 53/34
(52) U.S. Cl. .............. 423/210; 423/240 S; 423/244.07; 423/640
(58) Field of Search ........................... 423/210, 240 S, 423/244.07, 640

(56) References Cited

U.S. PATENT DOCUMENTS 4,604,269 A * 8/1986 Yoon ............................ 423/242
4,877,598 A * 10/1989 Von Jordan et al. .......... 423/640

FOREIGN PATENT DOCUMENTS

| | | | |
|---|---|---|---|
| DE | 4405010 A1 | 8/1995 | |
| WO | WO 90 09226 | 8/1990 | |
| WO | WO 96 16722 | 6/1996 | |
| WO | WO 97 37747 | 10/1997 | |

* cited by examiner

Primary Examiner—Stanley S. Silverman
Assistant Examiner—Timothy C Vanoy
(74) Attorney, Agent, or Firm—Birch, Stewart, Kolasch & Birch, LLP

(57) ABSTRACT

A method and an apparatus for cleaning flue gases with particulate slaked lime are described. In the method, burnt lime is dry-slaked with water to a moisture content of at least 5% by weight, and the slaked lime is contacted with the flue gases within 1 minute of the slaking. Preferably, the slaked lime is mixed with recirculated powdered lime from the flue gas cleaning before contacting it with the flue gases. The apparatus for dry-slaking of slaked lime comprises a feeding end for feeding burnt lime and, a discharge end for discharging slaked lime, a device for adding water, and mixers between the feeding and the discharge end, and the apparatus is characterized in that it comprises between the feeding end and the discharge end a first section and a second section which are separated by a first overflow edge, the sections comprising mixers which have rotatable horizontal shafts extending in the transverse direction of the apparatus, for mixing and feeding of burnt lime and water in the longitudinal direction of the apparatus from the feeding end towards the first overflow edge and from the first overflow edge towards a second overflow edge which is arranged at the discharge end.

9 Claims, 2 Drawing Sheets

METHOD AND APPARATUS FOR CLEANING FLUE GASES

This application is a Continuation of PCT International Application No. PCT/SE99/00806 filed on May 12, 1999, which designated the United States and on which priority is claimed under 35 U.S.C. §120, the entire contents of which are hereby incorporated by reference.

FIELD OF THE INVENTION

The present invention relates to a method and an apparatus for cleaning flue gases with slaked lime.

BACKGROUND ART

In different kinds of combustion, such as combustion of fossil fuels, waste etc, flue gases are generated, which contain pollutants which are removed before the flue gases are emitted into the atmosphere. The pollutants can be solid, such as fly ash, or gaseous, such as sulphur dioxide or hydrogen chloride. The solid pollutants can be removed by means of a filter, such as an electrostatic filter or fabric filter, whereas the gaseous pollutants are removed by absorption using an absorption agent. In wet cleaning of flue gases, gaseous pollutants are removed by means of an absorbing liquid containing an absorbing agent. Gaseous pollutants, for instance acid substances as sulphur dioxide and hydrogen chloride, can also be removed by contacting the flue gases with a particulate absorbent material, which usually is slaked lime (calcium hydroxide). The contact between the flue gases and the absorbent material can suitably occur after the flue gases have left the boiler. The present invention relates to the latter so-called dry sorption technique.

In the dry sorption technique, particulate slaked lime conditioned with water is dispersed in the flow of flue gas, on the one hand the hot flue gases being cooled by the water (usually from about 150° C. to about 70–80°C.) and, on the other hand, gaseous pollutants, such as sulphur dioxide, being absorbed by the particulate slaked lime. The particulate material is then removed from the flue gases by, for instance, filtration before the flue gases are emitted into the atmosphere. The separated particulate material, which below is referred to as powdered lime, is collected. A certain part of the collected powdered lime can be re-used in the flue gas cleaning by recirculation and addition of a small amount of unused, slaked lime. The remainder of the collected powdered lime is removed, for instance, by controlled dumping.

The slaked lime used in flue gas cleaning by the dry sorption technique is either purchased completed from a supplier of slaked lime or produced on site. Conventional production of slaked lime on site is performed in such manner that burnt lime is supplied from a storage to a dry-slaking apparatus, in which the burnt lime is slaked by adding an exactly dosed amount of water. After slaking, the slaked lime is supplied to a silo for storage. When slaked lime for flue gas cleaning is needed, it is fed from the silo through lines to a mixer, in which the slaked lime is mixed with recirculated powdered lime and conditioned with water before the mixture is contacted with the flue gases.

This conventional technique suffers from a number of drawbacks. Thus, the amount of water in the slaking of the lime must be dosed very exactly since adding more water than required for the slaking, which leaves as water vapour in the exothermal slaking reaction, causes aggregation into lumps. Such aggregation into lumps may result in blocking of the slaking apparatus and undesirable lumps in the storage silo and may interfere with or prevent feeding of slaked lime from the silo to the flue gas cleaning. A further drawback is that slaked lime has a stronger tendency to form dust and is more bulky than burnt lime. The same amount of slaked lime takes up almost twice the volume of burnt lime, which makes the slaked lime more expensive to handle and transport.

To enable handling and transporting of the slaked lime without any aggregating problems, the water content must be carefully controlled so that the slaked lime has a water content of 0–2% by weight. Such a low water content in turn causes a further problem, viz. that the slaked lime obtains a low surface area. It has in fact been established that the surface area of the slaked lime is essentially directly proportional to the water content of the slaked lime. Thus, slaked lime with a water content of 0–2% by weight has a surface area of about 15–18 $m^2/g$, while slaked lime with a water content of 10% by weight has a surface area of about 23 $m^2/g$ and slaked lime with a water content of 15% by weight has a surface area of slightly more than 30 $m^2/g$. Since the reactivity of the slaked lime in flue gas cleaning increases with an increasing surface area, it will be appreciated that a low water content and, resulting therefrom, a low surface area of the slaked lime result in a drawback.

One more drawback of the prior art is that the storage of the slaked lime makes it age and, inter alia, form carbonate by absorbing carbon dioxide from the atmosphere.

It will be appreciated that it would be desirable and would involve an improvement in the field if, in flue gas cleaning, it would be possible to use slaked lime with a high water content and high surface area without simultaneous aggregating problems. If also the other difficulties in storage and transport of slaked lime could be reduced or obviated, this would mean further advantages.

SUMMARY OF THE INVENTION

It has been discovered in the invention that the above difficulties in prior-art technique can be obviated by producing the dry-slaked lime in situ, i.e. in immediate connection with the flue gas cleaning, with a water content of at least 5% by weight.

According to the invention, a method for cleaning flue gases with particulate slaked lime is provided, said method being characterised in that burnt lime is first dry-slaked with water to a moisture content of at least 5% by weight, and that subsequently the slaked lime is contacted with the flue gases within 1 min of the slaking.

According to the invention, also an apparatus for cleaning of flue gases with particulate slaked lime is provided, said apparatus comprising a feeding end for feeding burnt lime and adding water, and a discharge end for discharging slaked lime, and mixing means between the feeding end and the discharge end, said apparatus being characterised in that between the feeding end and the discharge end it comprises a first section and a second section which are separated by a first overflow edge, the first section being arranged at the feeding end and comprising at least one mixing means, which is rotatable about a horizontal shaft extending in the transverse direction of the apparatus, for mixing and feeding of burnt lime and water in the longitudinal direction of the apparatus from the feeding end towards the overflow edge, and the second section being arranged at the discharge end and comprising at least one mixing means, which is rotatable about a horizontal shaft extending in the transverse direction of the apparatus, for mixing of material fed over the first overflow edge, and mixing of the material in the longitudinal direction of the apparatus towards a second overflow edge arranged at the discharge end.

Further characteristic features and advantages of the invention are evident from the following description and the appended claims.

DETAILED DESCRIPTION OF THE INVENTION

It is preferred that the slaked lime in the invention has a water content of 5–30% by weight, more preferably 10–20% by weight. Even if water contents above 20% by weight are usable, they may cause a risk of aggregating, and water contents above 50% by weight are avoided in the invention for this reason.

The high surface area and the porosity of the slaked lime according to the invention imply that it can contain more water than conventional slaked lime and remains free flowing, i.e. the high surface area reduces the aggregating problems.

A distinguishing feature of the invention is that the slaked lime is produced in situ, i.e. in immediate connection with its use for flue gas cleaning. This condition is expressed in the invention in such manner that the slaked lime is to be contacted with the flue gas within 1 min of the slaking. Preferably, the lime is contacted with the flue gases within 30 s of the slaking. By the slaked lime being produced in immediate connection with the flue gas cleaning, the need for a storage silo and transport lines and thus also the possible problems that would be caused by aggregating in these would be eliminated. The condition that the slaked lime is used for flue gas cleaning immediately upon its production means that also problems caused by aging of the slaked line are avoided.

Even if the slaked lime according to the invention can be used as it is for flue gas cleaning, for instance when cleaning precooled flue gas from waste incineration which contains hydrogen chloride, it constitutes a particularly preferred aspect of the present invention that the slaked lime is mixed with recirculated powdered lime from the flue gas cleaning before the thus-obtained mixture is contacted with the flue gases.

In addition to the fact that such recirculation of powdered lime results in economic utilisation of the absorbent material, possible aggregating problems will be further reduced. If too much water has been added to the burnt lime in connection with the slaking, this excess of water is in fact rapidly levelled when mixing with the recirculated powdered lime. This levelling is affected to a great extent by the amount of fresh, slaked lime being very small compared with the amount of recirculated powdered lime. It is generally preferred that the proportions between slaked lime and recirulcated powdered lime are from 1:50 to 1:500, based on the weight. An addition of about 100 kg slaked lime per 10 tonnes powdered lime is more preferred.

When mixing the slaked lime with recirculated powdered lime, also a conditioning of the mixture occurs by adding water. In the cleaning of flue gases it is in fact necessary, as mentioned above, that the absorbent material dispersed in the flue gases have a certain water content, on the one hand to optionally cool the flue gases and, on the other hand, to achieve a reaction between the absorbent material and the gaseous pollutants in the flue gases. As a rule, the slaked lime should thus during mixing with recirculated powdered lime be conditioned with water so that a relative humidity (RH) of 5–60% is obtained. More specifically, in absorption of sulphur dioxide from flue gases, the absorbent material should have a water content which produces a relative humidity of about 40–60%, while the corresponding relative humidity in absorption of hydrogen chloride from flue gases is about 5–10%. These values of the relative humidity are measured in the emitted flue gases after the absorbent material has been contacted with the flue gases. The reason why the RH value is lower in absorption of hydrogen chloride is that the slaked lime forms hygroscopic calcium chloride with hydrogen chloride. To achieve the necessary RH in the cleaning of flue gases, the mixture of slaked lime and recirculated powdered lime is conditioned by adding water, which is ejected in finely divided state through nozzles over the mixture. For an optimum result in flue gas cleaning, it is important for the components to be mixed and distributed as homogeneously as possible. Different apparatus for this purpose are previously known, and an example of such an apparatus is shown and disclosed in WO 96/16 722.

As indicated above, the slaked lime should be contacted with the flue gases within 1 min, preferably within 30 s of the slaking. These times do not include the time for slaking the burnt lime which takes about 3–20 min. On the other hand, the time for optional addition of recirculated powdered lime and conditioning of the mixture with water is included. This operation should thus be carried out within 1 min at most, and is preferably carried out within a time of 10 s to 1 min, more preferred 10–30 s.

For optimal efficiency, the slaked lime in the flue gas cleaning should have a small particle size. The slaked lime preferably has a particle size of 1–10 $\mu$m, more preferred 2–5 $\mu$m.

As indicated above, the invention also comprises an apparatus for cleaning of flue gases with particulate slaked lime.

In contrast to prior-art dry-slaking apparatus, in which axial screw feeding or the like causes a great risk of interference and interruption in connection with aggregation, the open structure of the invention and the radial feeding in relation to the mixing means cause the material to be mixed and fed without excessive compression with the ensuing risk of clogging and interruption.

In the above-described apparatus according to the invention, it is preferred that the mixing means in the first and the second section each consist of a rotatable shaft with radial arms at the outer ends of which paddles are attached, which make an angle with the direction of rotation.

It is also preferred that the leading edge of the paddles makes an angle with the direction of rotation of 10–45°.

The cross-section of the paddles in the circumferential direction can be straight. Alternatively, the cross-section of the paddles in the circumferential direction can be curved, for instance in the form of a segment of a circle.

In the first section, it is preferred that the extent of the paddles in the circumferential direction is relatively small and corresponds to a sector with an angle of about 5–30°. On the other hand, it is preferred to have a large number of paddles in the first section, such as mixing means with a rotatable shaft having 4–12 radial arms with 2 paddles per shaft.

In the second section, it is preferred that the extent of the paddles is relatively large both in the circumferential and in the axial direction. Thus, it is preferred that the paddles have an extent in the circumferential direction which corresponds to a sector with an angle of 30–90°. The extent in the axial direction is preferably such that 2–10 pairs of paddles cover the extent of the mixing means in the axial direction.

As is evident from the description above, the inventive apparatus can be connected directly to the flue gas duct, but according to a particularly preferred aspect of the invention, the apparatus is connected to one end of a chamber with means for supplying powdered lime recirculated from the flue gas cleaning, means for adding water, and means for mixing slaked lime, recirculated powdered lime, water and discharging the mixture from the other end of the chamber into contact with the flue gases. Such a chamber can be of a construction known per se and can, for instance, consist of an apparatus according to WO 96/16 722 stated above.

With a view to further facilitating the understanding of the invention, it will, for the purpose of elucidation, be described with reference to the accompanying drawings.

BRIEF DESCRIPTION OF THE DRAWINGS

The accompanying drawings illustrate in

Figure 1:
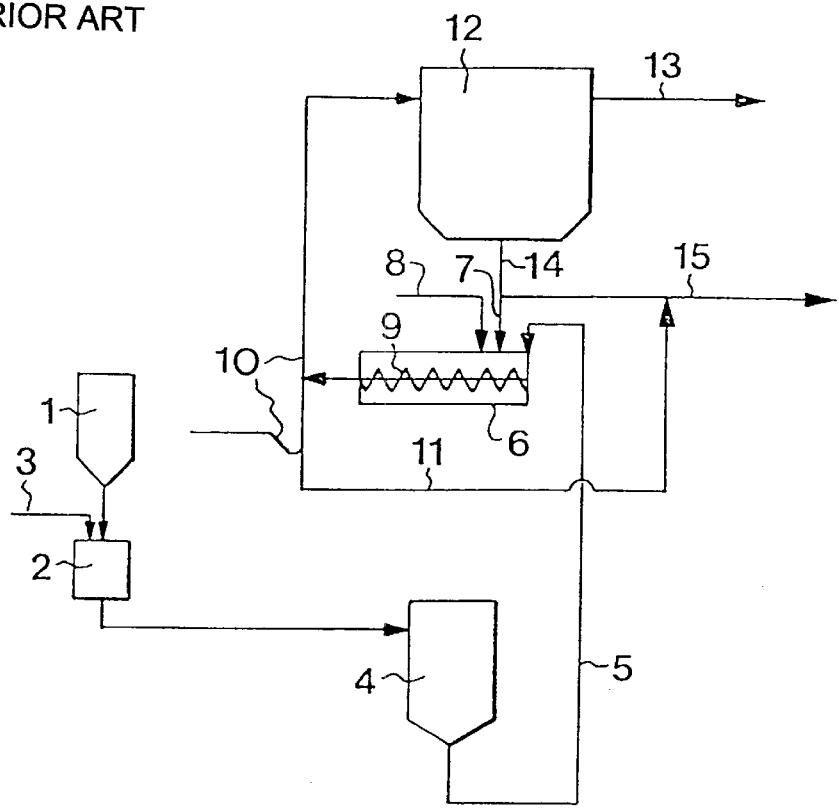
FIG. 1 a conventional plant for flue gas cleaning with slaked lime according to the dry sorption technique.

In conventional flue gas cleaning by the dry sorption technique with slaked lime according to FIG. 1, the slaked lime is produced by feeding burnt lime from a storage 1 to a slaking apparatus 2, to which also water for slaking is supplied through a conduit 3. As mentioned above, the added amount of water must in the slaking procedure be controlled very accurately to avoid aggregation. The slaked lime, which has a water content of 0–2% by weight, is fed from the slaking apparatus 2 to a storage silo 4 for storage. From the silo 4, slaked lime is fed through a conduit 5 to a mixing and conditioning apparatus 6, in which the slaked lime is mixed with the aid of mixing means 9 with recirculated powdered lime, which is supplied through a conduit 7. As mentioned above, the amount of slaked lime is very small in relation to the amount of powdered lime and usually in the order of 100 kg slaked lime per 10 tonnes powdered lime. The mixture of slaked lime and powdered lime is conditioned by adding water in finely divided state through a conduit 8. The conditioning occurs to a water content which results in a desired relative humidity in the subsequent contact between the absorbent material mixture and the flue gases. As mentioned above, this relative humidity is in the range of about 40–60% at a temperature of 70–80°C. when removing sulphur dioxide from flue gases. The mixing and conditioning apparatus 6 can, for instance, be of the type which has been mentioned above with reference to the WO 96/16 722.

From the conditioning and mixing apparatus 6, the conditioned mixture is discharged to a flue gas duct 10 for contact with flue gases which are supplied from a boiler (not shown). In the flue gas duct 10, the absorbent material mixture is dispersed in the hot (about 150° C.) flue gases, the water in the mixture cooling the flue gases (to about 70–80° C.) and the slaked lime reacting with the gaseous pollutants in the flue gases, such as sulphur dioxide. Part of the particulate absorbent material is collected in a pocket in the flue gas duct and is transported away through a conduit 11, while the remainder of the absorbent material accompanies the flue gases to a filter 12, in which the flue gases are relieved from particulate material and emitted into the atmosphere, as indicated with arrow 13. The particulate material separated from the flue gases, i.e. the powdered lime, is drawn off from the filter through a conduit 14, and part of the powdered lime is recirculated to the mixing and conditioning apparatus 6 through the conduit 7, while the remainder is drawn off through a conduit 15 to be joined with the powdered lime from the conduit 11 and then be dispensed with, for instance by controlled dumping.

Figure 2:
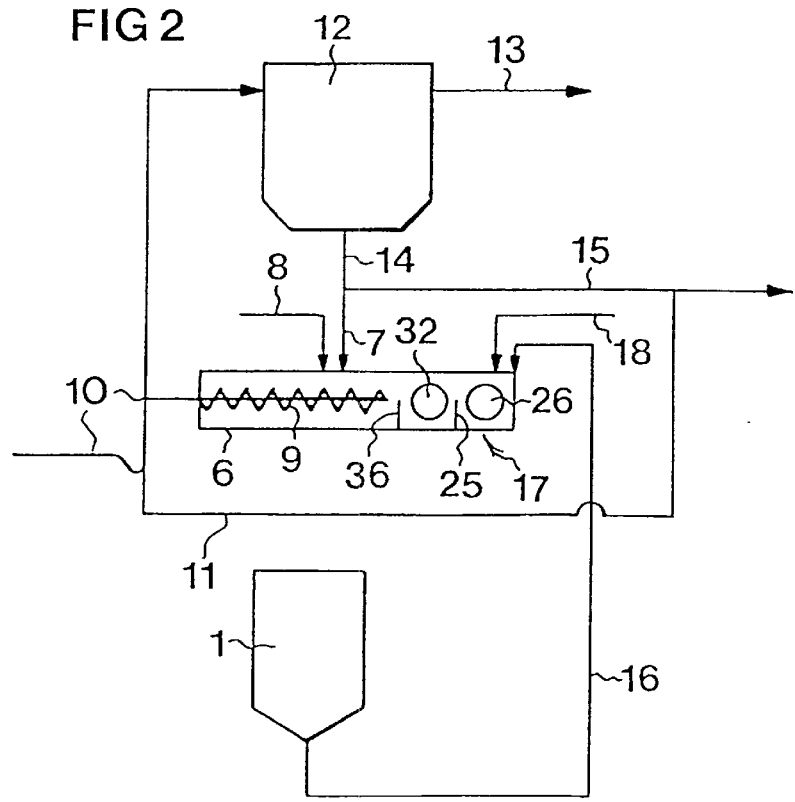
FIG. 2 a plant for flue gas cleaning with slaked lime by the dry sorption technique according to the present invention.

Having described the prior-art technique with reference to FIG. 1, a preferred embodiment of the invention will now be described with reference to FIGS. 2–4. In FIGS. 1 and 2, equivalent parts have been given the same reference numerals.

In flue gas cleaning by the dry sorption technique with slaked lime according to the invention, burnt lime is supplied, as shown in FIG. 2, from a storage 1 through a conduit 16 to a dry-slaking apparatus 17, which will now be described in more detail. Water is also supplied to the slaking apparatus 17 through a conduit 18 for slaking the burnt lime. The added amount of water is controlled so that the slaked lime obtains a water content of at least 5% by weight. The slaking of the burnt lime in the apparatus 17 occurs during mixing and takes about 3–20 min, whereupon the slaked lime is conveyed to a chamber 6 for conditioning and mixing of the slaked lime with recirculated powdered lime. The mixing and conditioning chamber 6 can consist of an integrated part of the dry-slaking apparatus 17 or consist of a separate apparatus, connected to the slaking apparatus 17, of the type as de scribed in connection with FIG. 1, for instance an apparatus as shown and disclosed in WO 96/16 722. The recirculated powdered lime is supplied through a conduit 7 and water for conditioning is supplied through a conduit 8, whereupon the components in the chamber 6 are mixed and conditioned with the aid of mixing means 9. The entire mixing and conditioning operation in the chamber 6 takes 1 min at most, preferably 10–30 s, so that the particulate absorbent material is ready to be fed into the flue gas duct 10 and contacted with the flue gases within 1 min of the slaking of the burnt lime.

As already mentioned, the slaked lime can be fed directly into the flue gas duct 10 without conditioning and mixing with recirculated powdered lime, but it is particularly preferred in the invention to carry out conditioning and mixing with recirculated powdered lime, as shown in FIG. 2.

By the slaking of the burnt lime being carried out in situ, i.e. in immediate connection with the introduction into the flue gas duct 10, the construction of the plant is simplified compared with the conventional plant in FIG. 1 and, among other things, the need for a storage silo for slaked lime is eliminated. By the slaked lime being fed essentially directly into the flue gas duct 10, the clogging problems in the storage silo 4 and the transport conduit 5 in the plant in FIG. 1 are also obviated. In spite of the burnt lime in the invention being slaked to a high water content of at least 5% by weight, clogging problems can be avoided by the slaking taking place in situ, as mentioned above. Any excess water in the slaked lime is also levelled out rapidly when mixing with recirculated powdered lime in the chamber 6. This means that the need for accurate control of the added amount of water in the dry-slaking apparatus is not at all as great in the invention as in prior-art technique.

By the slaked lime according to the invention having a high water content of at least 5% by weight, it will obtain a high porosity and a high surface area, as stated above. Thanks to this high surface area and porosity, the slaked lime according to the invention can absorb a larger amount of water than conventional slaked lime with a low surface area and porosity, without having a wet surface, and thus the slaked lime according to the invention remains free flowing at a higher water content compared with conventional slaked lime. This also contributes to reducing the clogging problems. As will appear from the description below, the special design of the dry-slaking apparatus according to the invention further contributes to reducing the clogging problems.

After mixing and conditioning, the particulate absorbent material is discharged from the chamber 6 and dispersed in the flue gas duct 10 in contact with the flue gases flowing therein. After reaction with the gaseous pollutants in the flue gases, part of the powdered lime is transported away through the conduit 11, while the remainder is separated from the flue gases in the filter 12 and discharged through the conduit 14. From the conduit 14, part of the powdered lime is recirculated through the conduit 7, while the remainder is joined, through the conduit 15, with the powdered lime from the conduit 11 and is transported away, for instance, for controlled dumping. The cleaned flue gases are emitted into the atmosphere, as indicated with arrow 13.

The special dry-slaking apparatus according to the invention will now described with reference to the FIGS. 3–4.

Figure 3:
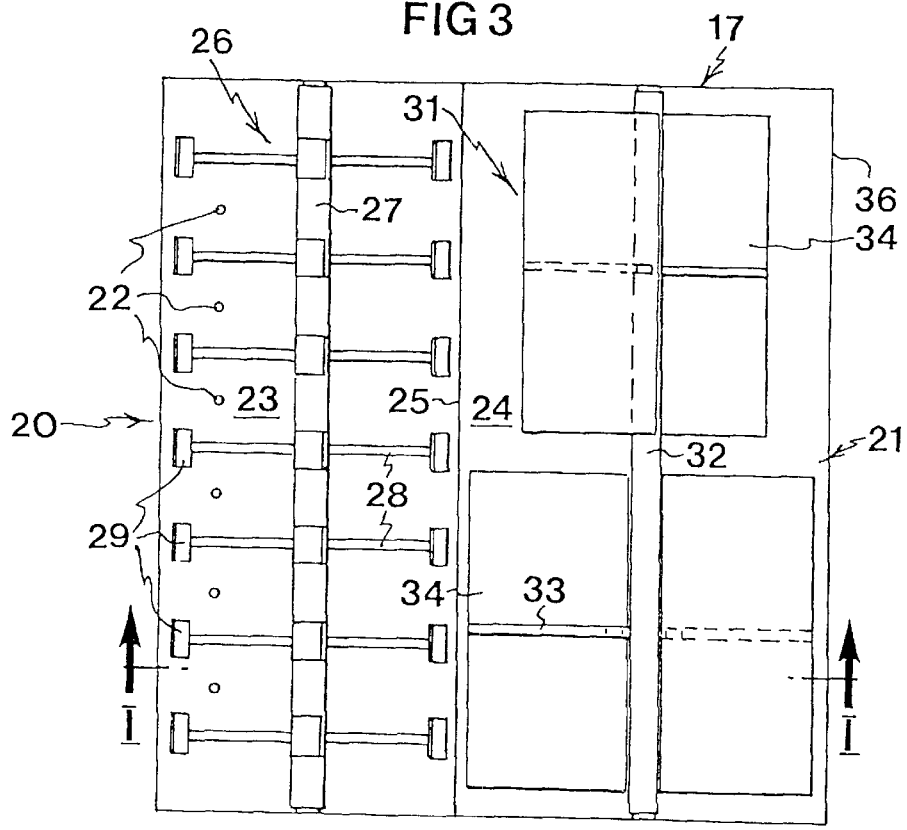
FIG. 3 a schematic top plan view of the dry-slaking apparatus in FIG. 2.

The dry-slaking apparatus 17 which is shown in FIG. 3 with the cover 19 removed, comprises a feeding end 20 for feeding burnt lime, and a discharge end 21 for discharging slaked lime. At the feeding end there are also means 22 in the form of nozzles for adding water in finely divided state. Water is supplied to the nozzles 22 through a conduit 18 (see FIG. 2). Between the feeding end 20 and the discharge end 21, the slaking apparatus has a first section 23 and a second section 24, which are separated by a first overflow edge 25 (see also FIG. 2). The first section 23, which is arranged at the feeding end, comprises a mixing means 26 (see also FIG. 2) which is rotatable about a horizontal shaft 27 in the transverse direction of the apparatus 17. The shaft 27 has radial arms 28, to the outer ends of which paddles 29 are fixed. The leading edge of the paddles makes an angle a with the direction of rotation 30 (FIG. 4). The angle α preferably is 10–45°. The extent of the paddles 29 in the circumferential direction in the first section 23 is relatively small and preferably corresponds to a sector with an angle of 5–30°. The mixing means 26, which comprise a shaft 27 with the arms 28 and the paddles 29, are adapted for mixing and feeding of the burnt lime and the water radially in relation to the mixing means and in the longitudinal direction of the apparatus from feeding end 20 towards the overflow edge 25 to the second section 24.

The second section 24, which is arranged at the discharge end 21, comprises a mixing means 31 which comprises a rotatable horizontal shaft 32 in the transverse direction of the apparatus 17, radial arms 33, on the shaft 32 and paddles 34 on the other ends of the arms 33. The leading edge of the paddles makes an angle β with the direction of rotation 35 (FIG. 4) which preferably is 10–45°. The extent in the circumferential direction of the paddles 34 in the second section 24 is larger than for the paddles 29 in the first section 23 and preferably corresponds to a sector with an angle 30–90°. As also indicated in FIG. 3, the axial extent of the paddles in the second section 24 is larger than that of the paddles in the first section 23, and the number of radial arms with paddles in the second section 24 is preferably smaller than the number of radial arms with paddles in the first section 23. The mixing means 31, which comprises the rotatable shaft 32, the arms 33 and the paddles 34, mixes the material supplied over the first overflow edge 25 and feeds it radially in relation to the mixing means 31 and in the longitudinal direction of the apparatus 17 towards a second overflow edge 36 (see also FIG. 2) which is arranged at the discharge end 21. Preferably, the second overflow edge 36 is arranged lower than the first overflow edge 25.

Figure 4:
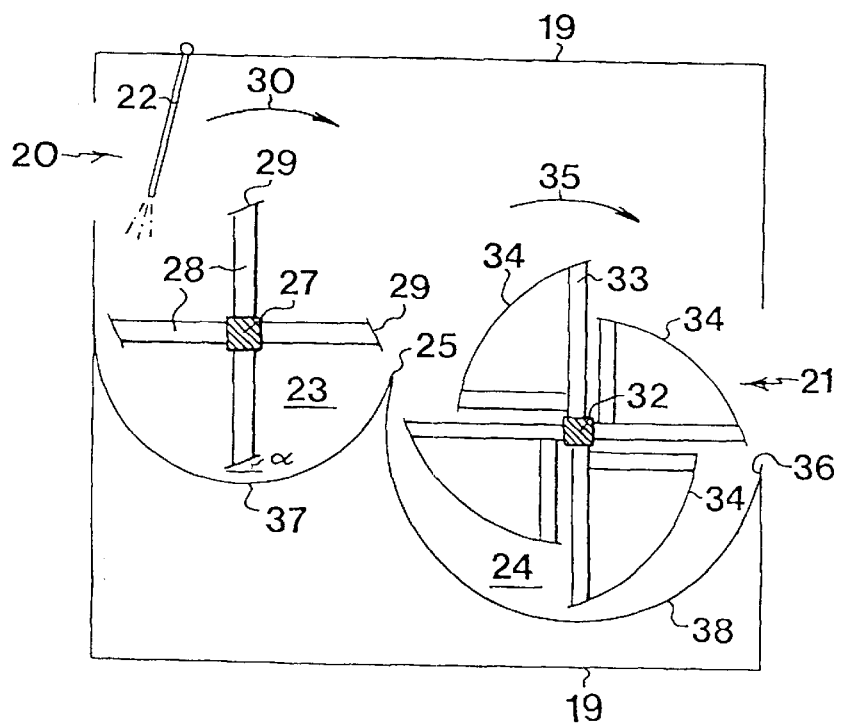
FIG. 4 a schematic cross-sectional view along line I—I in FIG. 3 of the dry-slaking apparatus.

As indicated in FIG. 4, the first section has a bottom 37 and the second section 24 has a bottom 38. Moreover, the slaking apparatus 17 is enclosed by a casing 19, whose cover is removed in FIG. 3, as mentioned above.

The open construction of the slaking apparatus according to the invention as described above and the feeding of the material in the longitudinal direction of the apparatus or in the radial direction relative to the transverse mixing means 26 and 31 contribute to preventing clogging of the slaked lime.

The invention has been described above with reference to specific, preferred embodiments, but it will be appreciated that various modifications and variations of the invention are feasible, without departing from the scope of the invention as defined in the appended claims.

What is claimed is:

1. A method for cleaning flue gases with particulate slaked lime comprising the steps of first burnt lime is dry-slaked with water to a moisture content of at least 5% by weight, and subsequently contacting the slaked lime with the flue gases within 1 minute of the slaking.

2. The method as claimed in claim 1, wherein the burnt lime is dry-slaked to a moisture content of 10–20% by weight.

3. The method as claimed in claim 1, wherein the slaked lime is contacted with the flue gases within 30 s of the slaking.

4. The method as claimed in claim 1, wherein the slaked lime after slaking is mixed with recirculated powdered lime from the flue gas cleaning before contacting it with the flue gases.

5. The method as claimed in claim 4, wherein the slaked lime is mixed with recirculated powdered lime in a weight ratio between slaked lime and recirculated powdered lime of from 1:50 to 1:500.

6. The method as claimed in claim 4, wherein the slaked lime during mixing with recirculated powdered slake is conditioned with water so that after the contact with the flue gases a relative humidity of 5–60% is obtained in the emitted flue gases.

7. The method as claimed in claim 1, wherein the burnt lime is slaked for a period of 3–20 minutes.

8. The method as claimed in claim 4, wherein the slaked lime is mixed with recirculated powdered lime for a period of 10 s to 1 minute.

9. The method as claimed in claim 8, wherein the slaked lime is mixed with recirculated powdered lime for 10–30 s.

* * * * *